United States Patent [19]

Seymour

[11] Patent Number: 4,541,928
[45] Date of Patent: Sep. 17, 1985

[54] TREATING LIQUIDS IN TANKS

[76] Inventor: Edward A. Seymour, Marylebone Hall, 35 Marylebone Rd., London N.W. 1, England

[21] Appl. No.: 604,605

[22] Filed: Apr. 30, 1984

Related U.S. Application Data

[63] Continuation of Ser. No. 525,793, Aug. 23, 1983, abandoned.

[30] Foreign Application Priority Data

| Feb. 24, 1981 | [GB] | United Kingdom | 8105692 |
| Jun. 22, 1981 | [GB] | United Kingdom | 8109232 |
| Sep. 4, 1981 | [GB] | United Kingdom | 8126877 |

[51] Int. Cl.⁴ .............................................. B03D 1/00
[52] U.S. Cl. ................... 210/177; 210/221.2; 210/926
[58] Field of Search ......................................... 210/177

[56] References Cited

U.S. PATENT DOCUMENTS

| 2,135,043 | 11/1938 | Seman | 261/77 |
| 2,540,948 | 2/1951 | Jeffrey | 210/220 |
| 3,216,181 | 11/1965 | Carpenter et al. | 55/256 |
| 3,884,812 | 5/1975 | Lindquist | 210/220 |
| 4,162,972 | 7/1979 | Green | 210/221.2 |
| 4,199,452 | 4/1980 | Mandt | 210/926 |

FOREIGN PATENT DOCUMENTS

| 336515 | 5/1977 | Austria . | |
| 81272 | 4/1966 | Canada | 210/220 |
| 1194337 | 6/1965 | Fed. Rep. of Germany . | |
| 2461852 | 7/1976 | Fed. Rep. of Germany . | |
| 2800035 | 7/1979 | Fed. Rep. of Germany . | |
| 138038 | 10/1979 | Fed. Rep. of Germany | 210/220 |
| 73531 | 6/1981 | Japan | 261/77 |
| 14473 | 8/1912 | United Kingdom | 261/77 |
| 1106527 | 3/1968 | United Kingdom . | |
| 2011795 | 1/1978 | United Kingdom . | |
| 1541345 | 2/1979 | United Kingdom . | |

Primary Examiner—John Adee
Attorney, Agent, or Firm—Stevens, Davis, Miller & Mosher

[57] ABSTRACT

Liquid is caused to circulate in a shallow tank which has an operational depth less than half the effective maximum distance across the tank. One wall 17 defines with another wall a corner 18 and a bubble curtain 19 is provided along the wall 17 adjacent the corner 18 which imparts to the liquid in the tank an upward vertical component of movement which is asymmetrical along the wall 17, causing greater vertical movement of liquid at said corner than at the other end of the wall. Liquid rising up the wall 17 moving away therefrom by reaction therewith will circulate with a horizontal component due to the asymmetrical arrangement of the bubble curtain. The invention can be applied to the separation of materials of different densities e.g. the separation of suspended solids or emulsified oils from waste water.

9 Claims, 4 Drawing Figures

U.S. Patent   Sep. 17, 1985   4,541,928
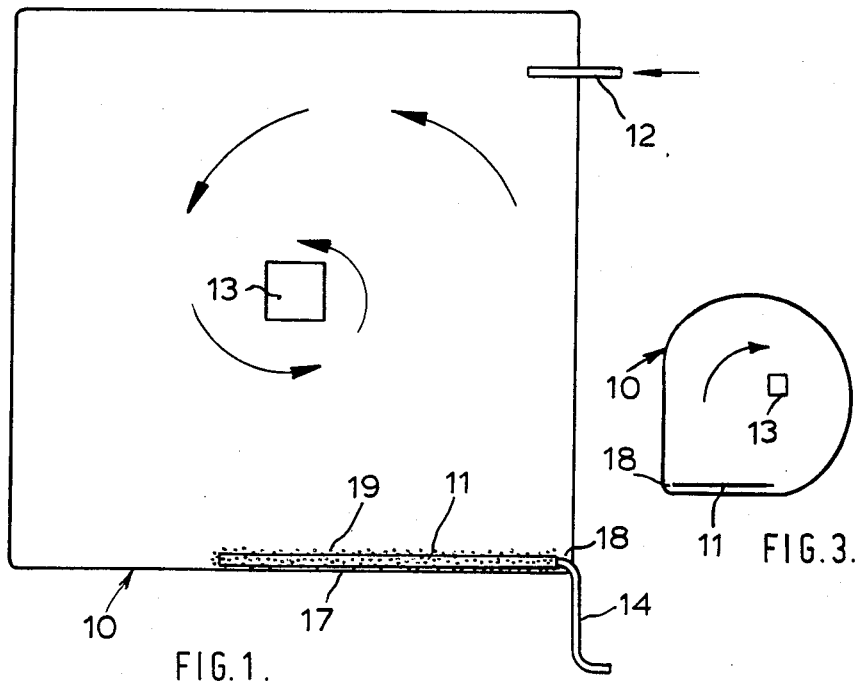
FIG.1.
FIG.3.
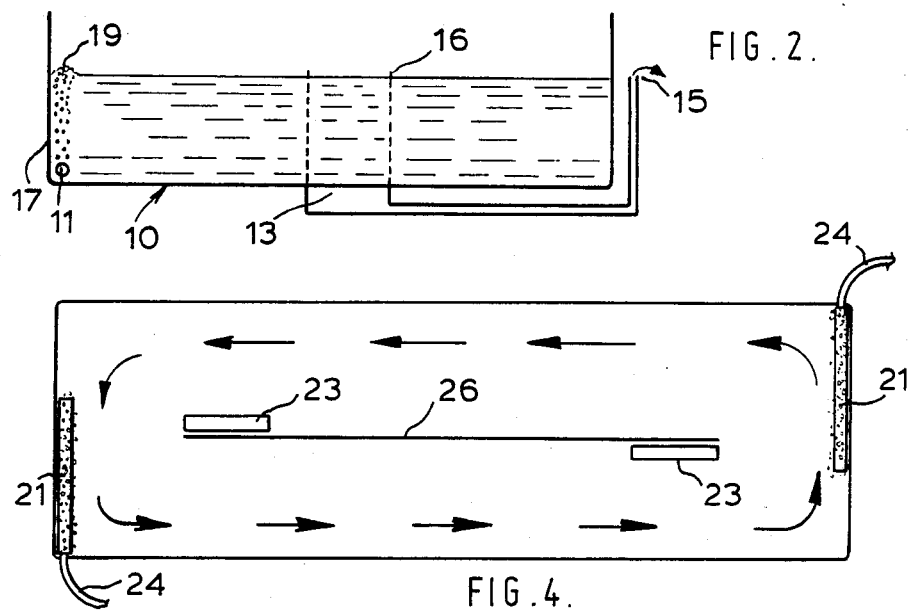
FIG.2.
FIG.4.

TREATING LIQUIDS IN TANKS

This application is a continuation, application Ser. No. 525,793, filed 8/23/83.

This invention relates to tanks in which means are provided to cause movement of liquid in the tank. Liquid which is not circulated becomes stagnant which is usually undesirable, so that some means must be provided to simulate the flow of water under gravity as in a stream or lake, or the tidal flow of the sea. Movement is also desired in tanks used for the treatment of liquids, for example in a sewage plant to aerate the liquid. Chemical process tanks may also require movement to mix the ingredients of a tank solution.

British patent specification No. 1,541,345 discloses a self-cleaning aquaculture tank, in which movement is provided by withdrawing water from the tank and recycling the withdrawn water through injectors as an emulsion of air bubbles, the injectors producing a stream of water and bubbles directed downwards across the tank. This apparatus requires means to circulate the water outside the tank by withdrawing it and feeding it to the injectors, and requires a plurality of relatively complicated injectors which introduce air to the recycled water.

Aquaculture is the culture of aquatic organisms and requires water of good quality. Poor quality water can lead to a loss of growth or disease epidemics. The culture organisms themselves can play a major part in lowering the water quality: respiration uses up dissolved oxygen; excretion adds toxic chemicals to the water and faces and uneaten food contribute to suspended solids. In order to negate this effect the water in aquaculture tanks is continuously replaced and may also be oxygenated.

Earlier aquaculture tanks have poor self-cleaning efficiency, particularly in relation to suspended solids. In designs similar to that of British Patent specification No. 1,541,345 the inflowing water has been directed at an angle to the surface of the tank water to set up a current within the tank such that solids are flushed out with the waste water and the water is evenly mixed. Tanks have been round or built with a rectangular configuration with elaborate turning vanes and partitions to conform to this process. Even so, these designs are susceptible to the formation of eddies and stagnant regions where suspended solids will settle on the tank floor. This is extremely unfavourable as it can lead to deterioration of water quality and make it necessary to clean the tank.

Round tanks waste space when a plurality are built and are expensive to construct because common walls cannot be used. The rectangular design is more efficient in utilising site space but construction costs may be prohibitive unless raceways are converted becuase of the relatively complex design. Oxygenation equipment has rarely been used satisfactorily within these tanks since it disrupts the precious flow pattern leading to formation of dead space.

Round tanks are also disclosed in British patent specification No. 1495852, but the liquid in these tanks is also caused to circulate by nozzles which eject air and liquid, in this case from separate outlets, at initial horizontal velocity. These round tanks have a depth comparable with their diameter. This specfication also discloses sewage treatment ditches in which liquid is circulated by nozzles arranged parallel to both sides of a central partition to follow a helical path in opposite directions on opposite sides of the partition. The helical flow is broken up at the ends of the tank as the liquid finds its way across to the other side of the partition for the return journey.

It is an object of the present invention to provide a simpler apparatus for causing movement of liquid in a tank. I have found that when liquid is moved vertically beside a tank wall, the reaction of the liquid on the wall at the surface gives the liquid a horizontal component of velocity away from the wall and in a closed tank the liquid will circulate by filling again at a position remote from the wall and will return again to the bottom of the wall. In a deep tank, the circulating path can be in a vertical plane normal to the wall, but in a shallow tank (whose depth is less than half the width) there is an interaction between the liquid moving one way in the surface regions and the returning liquid at the lower regions, so that the vertical circulation effect is impeded. Although this might be considered to be a disadvantage, I have found that an improved mixing effect can be achieved in such shallow tanks by arranging for the liquid to move away from the wall in a non-uniform flow across the tank. When the horizontal component of velocity of the liquid normal to the wall is stronger at one end of the tank than the other, the liquid will tend to swing towards the end of the tank with the lower horizontal component of velocity, so that the liquid will circulate horizontally as well as vertically, and although movement of the liquid in the surface regions impedes the return motion of liquid immediately below it in a shallow tank, the liquid can return at the other side of the tank. Thus the circulating path extends to all regions of the tank and good mixing is achieved.

I have found a bubble curtain is an efficient means of lifting the liquid. The curtain can be formed for example by introducing air into the liquid or by heating the liquid to produce vapour bubbles. It is possible to generate the curtain without imparting a substantial initial horizontal velocity to the liquid and it is only necessary to generate the bubbles so that they just escape from the generator, rather than being ejected at great horizontal velocity as shown in the earlier citations.

According to the invention there is provided liquid treatment apparatus comprising a tank having one wall defining with another wall a corner, means to define an operational depth of liquid in the tank which is at most 50% of the effective maximum distance across the tank normal to said one wall, means to provide a bubble curtain in the tank along said one wall adjacent said corner which curtain in use imparts to the liquid an upward vertical component of movement which is asymmetrical along said one wall causing greater vertical movement of liquid at said corner then at the other end of the wall, the arrangement of said bubble curtain providing means being such that liquid rising up said one wall which moves away therefrom by reaction therewith will develop a horizontal component of circulation extending away from said one wall at said corner.

The bubble curtain can be generated in any convenient manner. A heater or a porous or perforated pipe supplied with a fluid will create a bubble curtain which will entrain liquid. A sintered ceramic pipe may be suitable. A series of upwardly directed nozzles supplied with gas or vapor alone or together with other fluid may be used, and the direction of the nozzles will reinforce the lifting effect of the curtain. The asymmetry of liquid rise cam be achieved by generating the bubble curtain along only part of the side of the tank, and/or by causing it to raise the liquid so as to have a reaction against the wall which is asymmetrical along the side of the tank. This latter may be arranged by inclining the bubble curtain device to the wall in the horizontal plane (so that the reaction varies along the length of the wall) and/or in the vertical plane (so that the upward flow of liquid varies along the length of the wall, thus affecting the reaction against the wall). It may also be arranged by varying the porosity of a porous pipe used to create the curtain, varying the density of perforations in a perforated pipe or varying the heating effect of a heater along their respective lengths.

The walls of the tank mentioned above do not have to be external walls. One or both may be an internal partition as far as the reaction is concerned, the partition need only extend a short distance downfrom the surface, since the horizontal component of circulation is mainly caused by the reaction of the rising liquid at the surface. In this case it is the reaction of the liquid on the partition and not directly with the tank wall which causes the circulation.

Examples of the invention will now be described with reference to the accompanying drawings, in which:

FIG. 1 is a plan and FIG. 2 a central transverse section through a tank embodying this invention, and FIGS. 3 and 4 are plans of other tanks embodying the invention.

Liquid treatment tanks can be used for batch or continuous processing. The tank 10 shown in FIGS. 1 and 2 is arranged for continuous processing, having an inlet conduit 12 for providing a steady flow of fresh water to the tank at one side and a central evacuation sump 13 leading to an outlet 15 at a given height which controls the operational depth of water in the tank. The sump 13 is surrounded by a grid 16 which prevents escape of cultured organisms. If it is desired to evacuate from the surface of the tank during continuous processing, a central outlet weir may be provided and the height of the weir will control the operational depth of water in the tank.

A porous pipe 11 is located at the bottom of the tank along one side wall extending from one corner 18 of the tank along about 70% of the length of the wall 17. Air is fed from pipe 14 to the pipe 11 and escapes therefrom as a bubble curtain 19 adjacent the side wall 17 to entrain water up the side of the tank and the reaction of the rising water against the side of the tank causes water in the surface regions to move away from the side of the tank. Water will thus move away from the side wall 17 in a non-uniform manner, the movement being greatest at the corner 18 where the pipe 11 is located, and less at the left hand end beyond the pipe 11. The water will thus tend to circulate anticlockwise about the central sump 13, as indicated generally in FIG. 1. Since the water is raised by the bubble curtain 19 from the pipe 11, the circulation path will also include a corresponding fall of water in other regions of the tank. Because the tank is shallow, water moving away from the pipe 11 in the surface regions on the right hand side of the tank interacts with water in the lower regions, so that the water in the lower regions tends to return away from the corner 18 to generate the desired circulation path.

It would be possible to include further pipes 11 adjacent other side walls of the tank, arranged relative to the respective side walls to produce the same anticlockwise circulating motion as the pipe 11 illustrated in FIG. 1. Different bubble curtain generators may be used in the same tank.

It has been found that the best turning effect in water has been achieved with operational depths up to 25% of the distance across the tank.

FIG. 1 shows the porous pipe 11 extending from corner 18, but it may be spaced a small distance from the corner. In order to obtain favourable cleaning currents in the corner of the tank, the spacing should not exceed 10% of the length of the side wall. This small spacing is acceptable because, as will be seen from FIG. 1, liquid returning to this end of the pipe has a component of velocity along the length of the pipe and so its momentum will carry it on beyond the end of the pipe into the corner before the action of the pipe on the liquid causes it to rise up the side wall 17 again and move away from the wall in another circulation. Similarly the means spacing of the bubble curtain device away from the wall along which it extends should not exceed 10% of the maximum effective distance across the the tank normal to that wall.

For maximum effect, the bubble-forming means should be arranged to provide bubbles close to the wall along which it extends, but in such a way as to avoid clogging by materials in the liquid.

The tank is provided with slightly rounded corners to assist cleaning and the circulation of liquid. The square plan of the tank is well suited to the invention and is preferable for most efficient use of the ground space and ease of construction when a series of such tanks are constructed in an array. Of course, other shapes of tank can be used according to the requirements of use of the tank and shape of the site. FIG. 3 shows a tank whose side wall is smoothly curved except for one angular corner, and provided with a single pipe 11 extending from the angular corner along only part of the side wall. The bubble curtain from the pipe 11 will cause a circulation of the water as described above. Other tanks could be arranged with two or more such corners with curved portions in between. This arrangement might be preferred when round tanks are converted to use the invention more effectively.

FIG. 4 shows an elongated rectangular plan tank with two diffuser pipes 21 at the shorter ends of the tank, each arranged to produce a non-uniform bubble curtain along the shorter ends. A central partition 26 extends up the tank, with evacuation sumps 23 at each end. The non-uniformity of the bubble curtains causes water to flow anticlockwise in the tank, the water passing over an evacuation sump 23 just upstream of a bubble curtain.

The circulation pattern of the liquid may be more complicated than the single circuit shown in FIG. 1. A plurality of bubble curtains may be provided and these may provide a resultant single circuit, or several individual circuits. The several circuits should be arranged so that no stagnant areas remain in the tank between circuits. The formation of tank corners defined by at least one internal wall may be of assistance in this respect.

The bubble curtain may be formed by bubbles of vapour of the liquid being treated. For example, a bar heater may be placed at the location of pipe 11 indicated in FIG. 1 to achieve the same circulating effect. This method of raising the liquid may be more suitable when the treatment of the liquid requires heat and does not require aeration.

The porous pipe, heater element or other bubble curtain forming device may be mounted in the tank by any convenient means. It may be mounted adjacent, on or in the side or bottom wall of the tank, it may form part of the wall of the tank or even be mounted on a separate support within the tank which can be easily removed for maintenance. The bubble curtain device may form part of tank structure.

I have found that for the arrangement with porous piping placed horizontally along the side of the tank as shown in FIG. 1, there is an optimum performance of each length of porous pipe at a certain depth of liquid. Short lengths of porous pipe have optimum circulating effect at shallow depths and longer lengths (in relation to tank width) have optimum effect at deeper depths. Lengths of at least 10% and preferably at least 45% of tank width are considered useful.

Where maximum aeration of water is required, lengths in the upper range can be chosen and tests have shown that lengths in the range of 45-80% tank width give very good results.

These findings can be used to produce optimum circulating effect throughout a range of liquid depths by inclining the pipe to the horizontal so that the length of pipe which is effective to produce a strong bubbles curtain increases with depth and the optimum effect described above will be maintained at all depths.

It is also possible to achieve non-uniform movement of the liquid by varying the porosity of the pipe 11 along its length and varying the separation of the pipe 11 from the side of the tank or from the partition if such is used. This last method will give a reduced reaction against the wall of the tank for greater separation of the pipe. An increased reaction effect can be achieved if the bubble curtain is directed towards the wall of the tank from the element 11.

When it is desired to separate components of a charge from the tank, the turning of the liquid in the tank will cause components of the change to separate out due to velocity gradients. For example in FIG. 1, the arrangement shown will lead to higher velocities of flow in the liquid at the perimeter of the tank.

The tank could be used to separate or collect suspended solids in a central sump. Alternatively the gas infused into the tank can be used for froth flotation. In this process gas bubbles attach to emulsified oil particles or suspended solids with low settling velocities and lift them to the surface. The horizontal circulation achieved in this invention would lead to this floating material collecting in the middle of the tank in FIG. 1.

Heating and separation of solids is necessary in the initial stages of making beer. In this instance it could be advantageous to heat at specific points of the tank to achieve the horizontal circulation. This could be done with steam or any other suitable means. Alternatively in some processes steam could be used directly to form the bubble curtain.

Where horizontal circulation is desirable such as in some fermenting plants but where separation of suspended solids is not necessary in the first instance the bubble curtain device can be arranged to provide for the direction of circulation to alternate at regular intervals. This could for instance be done by altering the strength of the bubble curtain in relation to the ends of the side wall.

The circulation of the liquid leads to cleaning of the corner areas of the tanks. The turbulence in the corner area adjacent the strong end of the bubble curtain also leads to increased dissipation of the gas or vapour passed into the liquid to form the bubble curtain. This is highly desirable where it is required to dissolve said gas or vapour into the liquid or to dissipate its heating effect for example.

When the bubble curtain is formed from gas or vapour hereinafter referred to generally as gas, the gas escaping from the surface of the liquid can be collected for future use, for example for recirculation to a compressor which drives the gas through the bubble forming device, or to support a protective roof over the tank or tanks which will assist in maintaining the temperature and cleanliness of the liquid.

The references to a tank in the specification are intended to include any form of impoundment.

It is not necessary for the gas or vapour forming the bubble curtain to leave the bubble curtain forming means with an initial velocity so as to exchange momentum with the liquid in the tank, that is, the bubbles can simply escape from the means, rather that be ejected threfrom. The upward movement of the liquid and the horizontal circulating movement can be caused solely by the passive rising of gas or vapour in the liquid.

The tank need not be rectangular. Corners including angles between 45° and 135° are possible although angles between 60° and 120° give better results and 75° to 105° are even better. The base of the tank need not be horizontal, but can slope downwards from a side wall by as much as 45°.

When the liquid in the tank is at rest and the bubble curtain is started, the liquid will rise and the reaction with the wall will generate a movement away from the wall at right angles therewith. In the initial stages there will be no horizontal component of motion of liquid parallel to the wall. In the equilibrium state however there will be such a horizontal component, directed towards the corner, caused by liquid at the end of the wall remote from the corner being drawn towards the corner to replace the liquid moving away from the wall at the corner.

I claim:

1. A liquid treatment apparatus comprising a tank having one wall defining with another wall a corner, means to define an operational depth of liquid in the tank which is at most 50% of the effective maximum distance across the tank normal to said one wall, means to provide a bubble curtain in the tank along said one wall adjacent said corner which curtain in use imparts to the liquid an upward vertical component of movement which is asymmetrical along said one wall, causing greater vertical movement of liquid at said corner than at the other end of the wall, the arrangement of said bubble curtain providing mens being such that liquid rising up said one wall which moves away therefrom by reaction therewith will develop a horizontal component of circulation extending away from said one wall at said corner.

2. Apparatus as claimed in claim 1 wherein the means to define operational depth of liquid in the tank is at most 25% of the effective maximum distance across the tank.

3. Apparatus as claimed in claim 1 or claim 2 wherein the bubble curtain providing means comprises a porous pipe and means to supply a fluid to said pipe.

4. Apparatus as claimed in claim 1 or claim 2 wherein the bubble curtain providing means comprises a perforated pipe and means to supply a fluid to said pipe.

5. Apparatus as claimed in claim 1 or claim 2 wherein the bubble curtain providing means comprises a heater and means to energise said heater.

6. Apparatus as claimed in claim 1 or claim 2 wherein the bubble curtain providing means comprises nozzles directed upwardly and means to supply said nozzles with gas or vapour alone or together with other fluid.

7. Apparatus as claimed in claim 1 or claim 2 wherein the bubble curtain providing means within the tank is spaced from the wall more at one end than at the other to cause said asymmetrical movement.

8. Apparatus as claimed in claim 1 or claim 2 wherein the bubble curtain providing means within the tank in inclined to the horizontal to cause said asymmetrical movement.

9. Apparatus as claimed in claim 1 or claim 2 comprising a cover for the tank arranged to retain gas or vapour escaping from the liquid surface in the tank.

* * * * *